United States Patent
Jiang et al.

(10) Patent No.: US 10,075,970 B2
(45) Date of Patent: Sep. 11, 2018

(54) MISSION CRITICAL DATA SUPPORT IN SELF-CONTAINED TIME DIVISION DUPLEX (TDD) SUBFRAME STRUCTURE

(71) Applicant: QUALCOMM Incorporated, San Diego, CA (US)

(72) Inventors: Jing Jiang, San Diego, CA (US); Tingfang Ji, San Diego, CA (US); Krishna Kiran Mukkavilli, San Diego, CA (US); Naga Bhushan, San Diego, CA (US); Joseph Binamira Soriaga, San Diego, CA (US); Chih Ping Li, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/939,966

(22) Filed: Nov. 12, 2015

(65) Prior Publication Data
US 2016/0270103 A1 Sep. 15, 2016

Related U.S. Application Data

(60) Provisional application No. 62/133,389, filed on Mar. 15, 2015.

(51) Int. Cl.
*H04W 72/12* (2009.01)
*H04L 5/14* (2006.01)
*H04L 5/00* (2006.01)

(52) U.S. Cl.
CPC ....... *H04W 72/1242* (2013.01); *H04L 5/0044* (2013.01); *H04L 5/1469* (2013.01);
(Continued)

(58) Field of Classification Search
CPC .......... H04W 72/04; H04W 72/1242; H04L 5/0007; H04L 5/0064; H04L 5/0053
See application file for complete search history.

(56) References Cited

U.S. PATENT DOCUMENTS 9,398,575 B2 * 7/2016 Clevorn .............. H04W 72/085
9,930,687 B2 * 3/2018 Mizusawa ........... H04J 11/005
(Continued)

OTHER PUBLICATIONS

Soret et al., "Fundamental Tradeoffs among Reliability, Latency and Throughput in Cellular Networks," IEEE Proc. Globecom, Dec. 2014, pp. 1391-1396.*
(Continued)

*Primary Examiner* — Wutchung Chu
(74) *Attorney, Agent, or Firm* — Qualcomm IP Dept.; James Hunt Yancey, Jr.

(57) ABSTRACT

Various aspects of the present disclosure provide for enabling at least one opportunity to transmit mission critical (MiCr) data and at least one opportunity to receive MiCr data in a time division duplex (TDD) subframe during a single transmission time interval (TTI). The single TTI may be no greater than 500 microseconds. The TDD subframe may be a downlink (DL)-centric TDD subframe or an uplink (UL)-centric TDD subframe. How much of the TDD subframe is configured for the at least one opportunity to transmit the MiCr data and how much of the TDD subframe is configured for the at least one opportunity to receive the MiCr data may be adjusted based on one or more characteristics of the MiCr data. The MiCr data may have a low latency requirement, a high priority requirement, and/or a high reliability requirement. Various other aspects are provided throughout the present disclosure.

30 Claims, 9 Drawing Sheets

(52) U.S. Cl.
CPC ... *H04W 72/1268* (2013.01); *H04W 72/1273* (2013.01); *H04W 72/1278* (2013.01); *H04L 5/0007* (2013.01); *H04L 5/0055* (2013.01); *H04L 5/0064* (2013.01)

(56) References Cited

U.S. PATENT DOCUMENTS

| | | | | |
|---|---|---|---|---|
| 2008/0070586 | A1* | 3/2008 | Kermoal | H04L 5/003 455/452.2 |
| 2008/0080476 | A1* | 4/2008 | Cho | H04J 11/0093 370/350 |
| 2009/0161649 | A1* | 6/2009 | Ponnathota | H04B 1/707 370/342 |
| 2012/0057547 | A1* | 3/2012 | Lohr | H04L 5/0007 370/329 |
| 2012/0135773 | A1* | 5/2012 | Shen | H04L 5/0048 455/513 |
| 2013/0039193 | A1* | 2/2013 | Yin | H04W 72/0486 370/252 |
| 2013/0039231 | A1* | 2/2013 | Wang | H04W 72/10 370/280 |
| 2013/0083736 | A1* | 4/2013 | Yin | H04W 72/0446 370/329 |
| 2013/0194980 | A1* | 8/2013 | Yin | H04L 1/1607 370/280 |
| 2014/0071954 | A1* | 3/2014 | Au | H04W 72/0446 370/336 |
| 2014/0153450 | A1* | 6/2014 | Jang | H04B 7/2643 370/280 |
| 2014/0204783 | A1* | 7/2014 | Lin | H04W 24/02 370/252 |
| 2015/0036561 | A1* | 2/2015 | Wang | H04W 72/0446 370/280 |
| 2015/0092566 | A1* | 4/2015 | Balachandran | H04W 8/22 370/242 |
| 2015/0109972 | A1* | 4/2015 | Khoryaev | H04L 65/1069 370/280 |
| 2015/0180619 | A1* | 6/2015 | Majjigi | H04L 5/0005 370/330 |
| 2015/0181612 | A1* | 6/2015 | Gan | H04W 24/02 370/329 |
| 2015/0264662 | A1* | 9/2015 | Sahlin | H04W 72/1289 370/280 |
| 2015/0326291 | A1* | 11/2015 | Wong | H04L 7/0012 375/267 |
| 2015/0358918 | A1* | 12/2015 | Gao | H04W 52/146 455/522 |
| 2016/0142292 | A1* | 5/2016 | Au | H04L 5/0007 370/352 |
| 2016/0192396 | A1* | 6/2016 | Ng | H04W 74/0808 370/329 |
| 2016/0205683 | A1* | 7/2016 | Quan | H04W 16/10 370/280 |
| 2016/0212734 | A1* | 7/2016 | He | H04L 1/1861 |
| 2016/0233904 | A1* | 8/2016 | Wu | H04L 5/16 |
| 2016/0249329 | A1* | 8/2016 | Au | H04W 48/00 |
| 2016/0323852 | A1* | 11/2016 | Golitschek Edler von Elbwart | H04W 72/0446 |
| 2016/0330737 | A1* | 11/2016 | Takeda | H04W 72/0446 |
| 2016/0338081 | A1* | 11/2016 | Jiang | H04W 72/1205 |
| 2016/0366704 | A1* | 12/2016 | Lee | H04W 72/0413 |
| 2017/0013610 | A1* | 1/2017 | Lee | H04L 1/00 |
| 2017/0019905 | A1* | 1/2017 | Ko | H04B 17/24 |
| 2017/0019930 | A1* | 1/2017 | Lee | H04W 74/0833 |
| 2017/0118743 | A1* | 4/2017 | Kim | H04L 5/14 |
| 2017/0150424 | A1* | 5/2017 | Lee | H04W 48/12 |
| 2017/0215188 | A1* | 7/2017 | Kim | H04L 5/0044 |
| 2017/0215201 | A1* | 7/2017 | Kim | H04W 72/1268 |
| 2017/0257878 | A1* | 9/2017 | Kazmi | H04L 5/14 |
| 2017/0303144 | A1* | 10/2017 | Guo | H04L 5/0051 |

OTHER PUBLICATIONS

Levanen Toni et al: "Dense small-cell networks: Rethinking the radio interface beyond L TE-advanced", 1st International Conference on 5G for Ubiquitous Connectivity, ICST, Nov. 26, 2014 (Year: 2014).*

International Search Report and Written Opinion—PCT/US2016/019935—ISA/EPO—dated Jun. 30, 2016.

Lu Y., et al., "Uplink Control for Low Latency HARQ in TDD Carrier Aggregation", Vehicular Technology Conference (VTC Spring), 2012 IEEE 75th, IEEE, May 6, 2012 (May 6, 2012), pp. 1-5, XP032202607, DOI: 10.1109/VETECS.2012.6240190, ISBN: 978-1-4673-0989-9, abstract Section I; p. 1.

Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].

Toni L., et al., "Low latency radio interface for 5G flexible TDD local area communications", 2014 IEEE International Conference on Communications Workshops (ICC), IEEE, Jun. 10, 2014 (Jun. 10, 2014), pp. 7-13, XP032630785, DOI: 10.1109/ICCW.2014.6881164 [retrieved on Aug. 29, 2014] the whole document.

* cited by examiner

MISSION CRITICAL DATA SUPPORT IN SELF-CONTAINED TIME DIVISION DUPLEX (TDD) SUBFRAME STRUCTURE

PRIORITY CLAIM

This application claims priority to and benefit of provisional patent application No. 62/133,389 filed in the United States Patent and Trademark Office on Mar. 15, 2015, the entire content of which is hereby incorporated herein by reference.

TECHNICAL FIELD

Aspects of the present disclosure relate, generally, to wireless communication systems and, more particularly, to mission critical data support in self-contained time division duplex (TDD) subframe structure.

BACKGROUND

Wireless communication networks are widely deployed to provide various communication services such as telephony, video, data, messaging, broadcasts, and so on. Such networks, which are usually multiple access networks, support communications for multiple users by sharing the available network resources. The spectrum allocated to such wireless communication networks can include licensed spectrum and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. The demand for wireless communication continues to increase for many use cases, including but not limited to telephones, smart phones, personal computers, smart meters, remote sensors, smart alarms, mesh nodes, and many others. Time division duplex (TDD) carriers may be utilized in many wireless communication networks. Enhancements directed to TDD carriers may benefit such wireless communication networks and the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides an apparatus for wireless communication. The apparatus includes a transceiver, a memory, and at least one processor communicatively coupled to the transceiver and the memory. The at least one processor and the memory may be configured to generate instructions for the transceiver to enable at least one opportunity to transmit mission critical (MiCr) data and at least one opportunity to receive MiCr data in a time division duplex (TDD) subframe during a single transmission time interval (TTI). The at least one processor and the memory may be further configured to communicate the MiCr data in the TDD subframe during the single TTI.

In another aspect, the present disclosure provides a method for wireless communication. The method may include generating instructions for a transceiver to enable at least one opportunity to transmit MiCr data and at least one opportunity to receive MiCr data in a TDD subframe during a single TTI. The method may also include communicating the MiCr data in the TDD subframe during the single TTI.

In yet another aspect, the present disclosure provides a computer-readable medium configured for wireless communication. The computer-readable medium includes computer-executable instructions that may be configured for enabling at least one opportunity to transmit MiCr data and at least one opportunity to receive MiCr data in a TDD subframe during a single TTI. The computer-executable instructions may be further configured for communicating the MiCr data in the TDD subframe during the single TTI.

In a further aspect of the present disclosure, the present disclosure provides an apparatus for wireless communication. The apparatus may include means for enabling at least one opportunity to transmit MiCr data and at least one opportunity to receive MiCr data in a TDD subframe during a single TTI. The apparatus may also include means for communicating the MiCr data in the TDD subframe during the single TTI.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others). Such services and/or applications may benefit from latency targets that can differ considerably from one another. However, the one-size-fits-all latency configuration of an LTE network can make multiplexing of traffic with different latency targets challenging. The spectrum compatibility of a system that supports such diverse latency targets can also be challenging. For example, time multiplexing of regular traffic and low latency traffic (e.g., mission critical (MiCr) data) may violate certain requirements of the low latency traffic (e.g., MiCr data). Furthermore, reserved frequency domain resources for low latency traffic (e.g., MiCr data) may limit the peak rate and trunking efficiency. Accordingly, support for multiplexing various types, classes, and categories of traffic and services having considerably different latency characteristics may enhance such next-generation networks (e.g., 5G networks) and the overall user experience.

Figure 1:
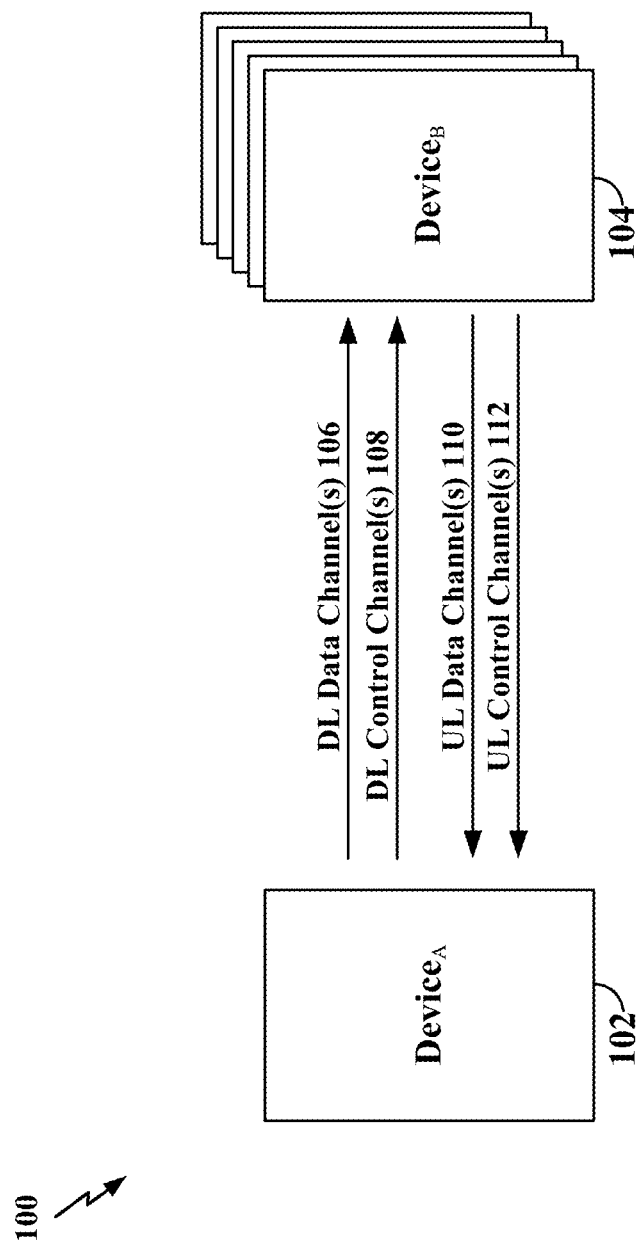
FIG. 1 is a block diagram illustrating an example of various uplink (UL) and downlink (DL) communications between two devices.

FIG. 1 is a block diagram illustrating an example of various uplink (UL) and downlink (DL) communications between two devices. In accordance with aspects of the present disclosure, the term 'downlink' may refer to a point-to-multipoint transmission originating at $Device_A$ 102, and the term 'uplink' may refer to a point-to-point transmission originating at $Device_B$ 104. Broadly, $Device_A$ 102 is a node or device responsible for scheduling traffic in a wireless communication network, including various DL and UL transmissions. $Device_A$ 102 may sometimes be referred to as a scheduling entity, a scheduler, and/or any other suitable term without deviating from the scope of the present disclosure. $Device_A$ 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, $Device_B$ 104 is a node or device that receives scheduling and/or control information, including but not limited to scheduling grants, synchronization or timing information, or other control information from another entity in the wireless communication network, such as $Device_A$ 102. $Device_B$ 104 may be a referred to as a subordinate entity, a schedulee, and/or any other suitable term without deviating from the scope of the present disclosure. $Device_B$ 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

$Device_A$ 102 may transmit DL data channel(s) 106 and DL control channel(s) 108. $Device_B$ 102 may transmit UL data channel(s) 110 and UL control channel(s) 112. The channels illustrated in FIG. 1 are not necessarily all of the channels that may be utilized by $Device_A$ 102 and $Device_B$ 104. Those of ordinary skill in the art will recognize that other channels may be utilized in addition to those illustrated, such as other data, control, and feedback channels.

As described above, some data may be characterized as MiCr data. In some configurations, MiCr data refers to data that has a relatively low or ultra-low latency requirement. For example, the latency requirement of MiCr data may be lower than the latency requirement of other data included in that subframe. Generally, latency refers to the delay associated with receipt of data at its intended destination. In some configurations, MiCr data refers to data that has a relatively high priority requirement. For example, the priority requirement of MiCr data may be higher than the priority requirement of other data included in the subframe. Generally, priority refers to the importance or time-sensitivity of the data. Data having relatively higher importance and/or relatively greater time-sensitivity should be received before other data having relatively lesser importance and/or relatively lesser time-sensitivity. In some configurations, MiCr data refers to data that has a relatively high reliability requirement. For example, the reliability requirement of MiCr data may be greater than the reliability requirement of other data included in that subframe. Generally, reliability refers to how consistently data is successfully received by the intended destination without errors.

Figure 2:
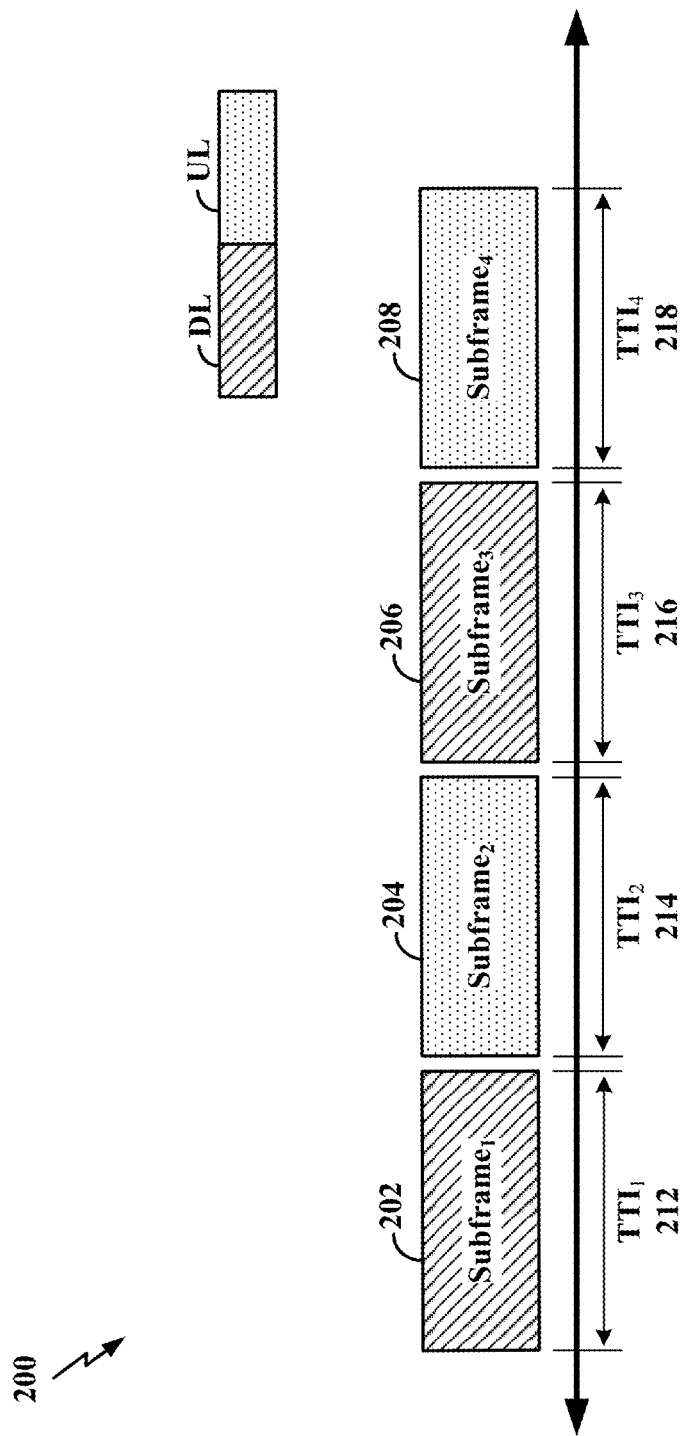
FIG. 2 is a diagram illustrating an example of various subframe configurations according to aspects of some communication systems.

FIG. 2 is a diagram 200 illustrating an example of various subframe configurations according to aspects of some communication systems. Generally, as used within the present disclosure, a frame may refer to an encapsulated set and/or packet of data and/or information. A frame may include a plurality of subframes. Each subframe may include a plurality of symbols. Each subframe may have a particular duration. A transmission time interval (TTI) refers to the duration of a single subframe. Accordingly, a TTI refers to the duration of the aforementioned plurality of symbols in the single subframe. Each symbol may be received and decoded at a receiver. Each symbol may correspond to a single turbo code word that the receiver may understand and decode. In some configurations, a TTI may refer to the smallest granularity of a collection of symbols to be processed at the receiver. One of ordinary skill in the art will understand that the terms 'frame' and/or 'subframe' may be known as or referred to by various other suitable terms without deviating from the scope of the present disclosure.

The subframes illustrated in FIG. 2 may sometimes be referred to as time division duplex (TDD) subframes. For illustrative purposes, four TDD subframes are illustrated in FIG. 2. Subframe$_1$ 202 is a DL communication during TTI$_1$ 212. Subframe$_2$ 204 is an UL communication during TTI$_2$ 214. Subframe$_3$ 206 is a DL communication during TTI$_3$ 216. Subframe$_4$ 208 is an UL communication during TTI$_4$ 218. In some communication systems, subframes may be scheduled as a DL subframe (e.g., Subframe$_1$ 202, Subframe$_3$ 206) or an UL subframe (e.g., Subframe$_2$ 204, Subframe$_4$ 208). Accordingly, DL MiCr data can be communicated in Subframe$_1$ 202 during TTI$_1$ 212 and/or Subframe$_3$ 206 during TTI$_3$ 216, and UL MiCr data can be communicated in Subframe$_2$ 204 during TTI$_2$ 214 and/or Subframe$_4$ 208 during TTI$_4$ 218.

However, in some communication systems, UL MiCr data cannot be communicated in Subframe$_1$ 202 during TTI$_1$ 212 nor in Subframe$_3$ 206 during TTI$_3$, and DL MiCr data cannot be communicated in Subframe$_2$ 204 during TTI$_2$ 214 nor in Subframe$_4$ 208 during TTI$_4$ 218. Accordingly, instead of communicating UL MiCr data in Subframe$_1$ 202 during TTI$_1$ 212 and/or Subframe$_3$ 206 during TTI$_3$, communication of UL MiCr data will be delayed until Subframe$_2$ 204 during TTI$_2$ 214 and/or Subframe$_4$ 208 during TTI$_4$ 218, respectively. Also, instead of communicating DL MiCr data in Subframe$_2$ 204 during TTI$_2$ 214, communication of DL MiCr data will be delayed until Subframe$_3$ 206 during TTI$_3$. Of course, this MiCr data latency can be extended to an even greater duration when multiple consecutive subframes are all in a single direction, and a MiCr packet is to be communicated in the other direction. Such a large latency in communicating MiCr data may adversely affect the communication system and the overall user experience.

Accordingly, one of ordinary skill in the art will readily understand that communication utilizing a TDD carrier may have certain drawbacks. While a device is transmitting a symbol, its receiver is disabled and generally unable to receive a symbol. Similarly, while a device is receiving a symbol, its transmitter is disabled and it is generally unable to transmit a symbol. One approach that attempts to overcome such an issue is to pair two TDD carriers with one another in a way that can enable full duplex communication at certain time slots, as described in greater detail below with reference to FIG. 3.

Figure 3:
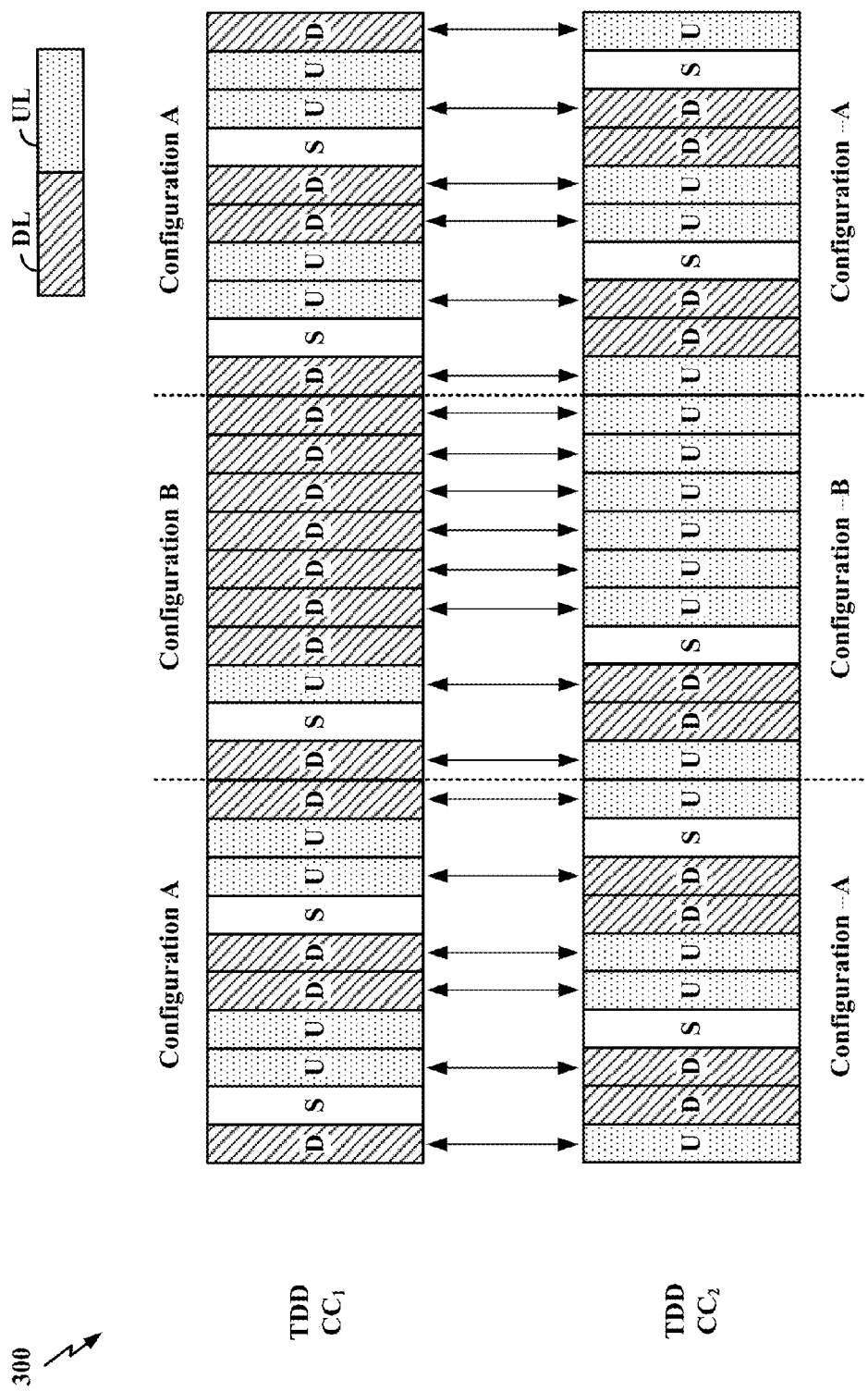
FIG. 3 is a diagram illustrating another example of various subframe configurations according to aspects of some communication systems.

FIG. 3 is a diagram 300 illustrating another example of various subframe configurations according to aspects of some communication systems. More specifically, FIG. 3 illustrates an example of a pairing of two TDD component carriers (CC). A first CC (CC$_1$) is paired with a second CC (CC$_2$). In the diagram 300, the horizontal axis represents time (not to scale), and the vertical axis represents frequency (not to scale). CC$_1$ and CC$_2$ are TDD carriers. Uplink time slots (indicated with a "U") are time-multiplexed with downlink time slots (indicated with a "D") on each respective carrier. Some time slots are special time slots (indicated with an "S"), as described further below. Generally, a time slot may correspond to any suitable duration of time and may correspond to other nomenclature such as a TTI, a subframe, a frame, a symbol, a duration of time, and/or any other suitable term.

As illustrated in diagram 300, the frame configured as "Configuration A" is paired with a frame configured as "Configuration—A", wherein "Configuration—A" represents the inverse (or conjugate) of "Configuration A." Likewise, "Configuration B" frame is paired with a frame configured as "Configuration—B." Here, CC$_2$ may implement an inverse, conjugate, and/or complementary transmit/receive organization relative to that of CC$_1$. The terms inverse, complementary, and/or conjugate may be utilized interchangeably, generally referring to a configuration wherein at least some of the downlink time slots ("D") in CC$_1$ are paired with uplink time slots ("U") in CC$_2$, and at least some of the uplink time slots ("U") in CC$_1$ are paired with downlink time slots ("D") in CC$_2$.

The special time slot ("S") may be utilized for downlink-to-uplink switching. For example, a scheduling entity (e.g., Device$_A$ 102) may utilize these special time slots ("S") as time gaps for a subordinate entity (e.g., Device$_B$ 104) to transition from a downlink time slot ("D") to an uplink time slot ("U") when utilizing a TDD carrier. For example, there may exist a propagation delay between the transmission of the downlink time slot ("D") from the scheduling entity (e.g., Device$_A$ 102) to the subordinate entity (e.g., Device$_B$ 104). To account for such a propagation delay, special time slots ("S") provide a time gap between the end of an downlink time slots ("D") and the beginning of an uplink time slot ("U") such that the scheduling entity (e.g., Device$_A$ 102) and the subordinate entity (e.g., Device$_B$ 104) can maintain synchronization. Here, the time gap may correspond to a time when neither uplink nor downlink communication occurs.

However, switching between downlink time slots ("D") and uplink time slots ("U") may require complex interference management protocols. Also, paired component carriers may not always be available. Even if available, some time slots may not have a conjugate time slot. In other words, as illustrated in FIG. 3, not every downlink time slots ("D") has a conjugate uplink time slots ("U"). For example, time slots in CC$_1$ do not have conjugate time slots in CC$_2$ whenever CC$_2$ has a special time slot ("S"). In other words, whenever CC$_1$ or CC$_2$ has a special time slot ("S"), the communication system does not have the capability to utilize both an uplink time slot ("U") and a downlink time slot ("D") at the same time. As such, the communication system cannot benefit from simultaneous/concurrent UL and DL communications when one of the component carriers is scheduled for a special time slot ("S"). Accordingly, the communication system may have to delay simultaneous/concurrent UL and DL communications until the end of that special time slot ("S"). Such latency in communicating certain types of data (e.g., MiCr) may adversely affect the communication system and the overall user experience.

Figure 4:
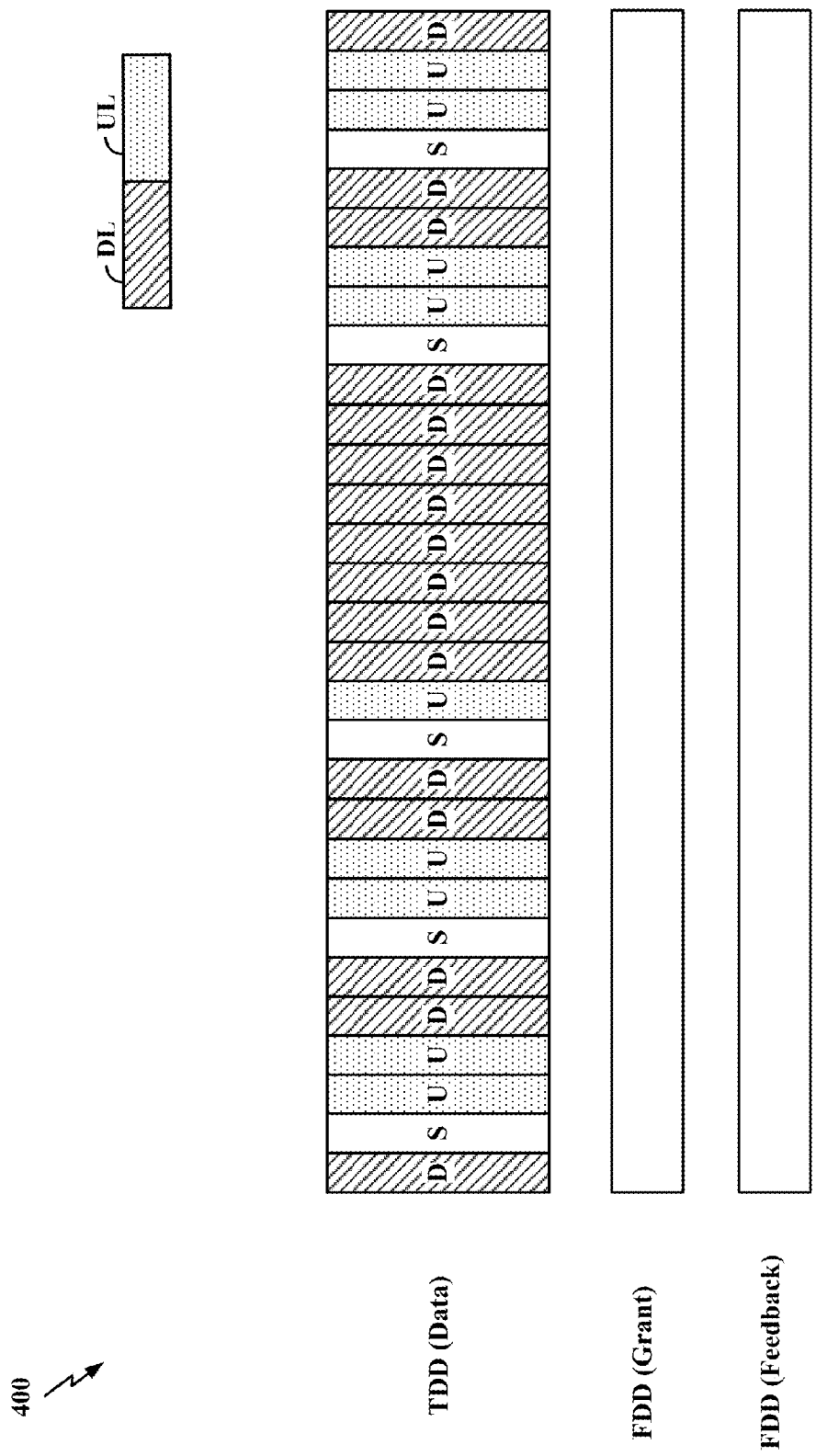
FIG. 4 is a diagram illustrating yet another example of various subframe configurations according to aspects of some communication systems.

FIG. 4 is a diagram 400 illustrating yet another example of various subframe configurations according to aspects of some communication systems. Various aspects of the TDD carriers illustrated in FIG. 4 are similar to aspects of the TDD carriers described above with reference to FIG. 3 and therefore will not be repeated. TDD carriers may be utilized to transmit data from one device to another device. Frequency division duplex (FDD) carriers may be utilized to trigger a switch between downlink time slots ("D") and uplink time slots ("U"). For example, an FDD carrier may indicate that the communication system should switch from a downlink time slot ("D") to an uplink time slot ("U"). An FDD carrier may also be used for communicating feedback. For example, an FDD carrier may be utilized to communicate an acknowledgement message (ACK) or a negative acknowledgement message (NACK).

However, switching between downlink time slots ("D") and uplink time slots ("U") may require complex interference management protocols. Also, the communication system is unable to perform simultaneous/concurrent high bit rate DL and UL communication. In the example illustrated in FIG. 4, the TDD carriers accommodates a single component carrier that can either (i) perform an UL communication during an uplink time slot ("U"), (ii) perform a DL communication during a downlink time slot ("D"), or (iii) transition from a DL communication to an UL communication during a special time slot ("S"). Accordingly, the communication system faces unavoidable delays during special time slots ("S"). The communication system cannot perform a DL communication nor an UL communication during the special time slot ("S"). Accordingly, the communication system may have to delay the UL/DL communication until the end of the special time slot ("S"). Such delays in communicating certain types of data (e.g., MiCr) may adversely affect the communication system and the overall user experience.

The description provided above with reference to FIGS. 2-4 pertains to some communication systems. Generally, such communication systems may introduce delays in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure may reduce or eliminate these issues by enabling communication of both UL MiCr data and DL MiCr data in the same, single TDD subframe. Furthermore, aspects of the present disclosure enable such communication without dynamic UL/DL switching, which facilitates interference management and avoids some of the complex interference management protocols of some communication systems, as described above with reference to FIGS. 2-4.

Figure 5:
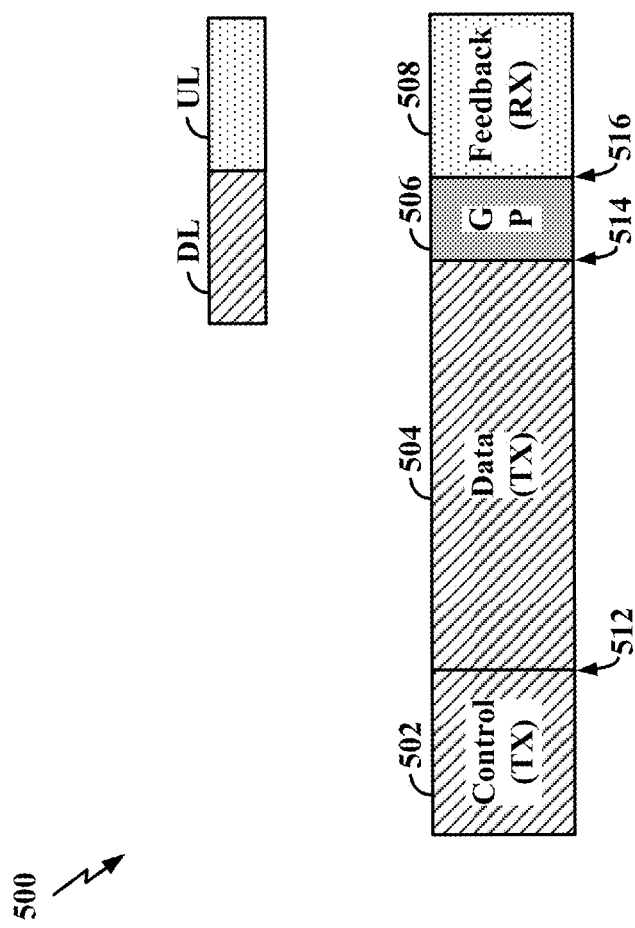
FIG. 5 is a diagram illustrating an example of a DL-centric time division duplex (TDD) subframe according to aspects of the present disclosure.

FIG. 5 is a diagram 500 illustrating an example of a DL-centric TDD subframe according to aspects of the present disclosure. In some examples, such a TDD subframe may be a self-contained TDD subframe. A self-contained TDD subframe may contain control information, data, and acknowledgement information within a single TDD subframe. The control information may include scheduling information. The control/scheduling information may provide control/scheduling for all of the data within that same subframe. The acknowledgement information may include acknowledgement (ACK) or negative acknowledgement (NACK) signals for all of the data within that same subframe. The ACK signal and/or NACK signal may be reserved for all data packets before the next scheduling instance (where the next subframe also includes scheduling for data in that subframe). In some configurations, the acknowledgement information corresponding to certain data in a particular subframe may be included in a different subframe. For example, the ACK/NACK signal corresponding to MiCr data in a first subframe may be included in a second subframe (which may be subsequent to the first subframe).

Additional description pertaining to such a self-contained subframe is provided throughout the present disclosure. The self-contained TDD subframe structure may include transmissions in both the uplink direction as well as the downlink direction. In some examples, the self-contained TDD subframe includes DL control/scheduling information, DL data information corresponding to the scheduling information and UL acknowledgement information corresponding to the data information, as described in greater detail herein. In other examples, the self-contained subframe includes DL control/scheduling information, UL data information corresponding to the scheduling information and DL acknowledgement information corresponding to the data information, as described in greater detail herein. Even if not explicitly referred to as a self-contained subframe, one of ordinary skill in the art will understand that any one or more of the subframes described herein may be configured, implemented, and/or otherwise deployed as a self-contained subframe without deviating from the scope of the present disclosure.

Referring to the example illustrated in FIG. 5, the DL-centric TDD subframe includes a control portion 502. The control portion 502 may include various scheduling information and/or control information corresponding to various portions of the DL-centric TDD subframe. In some configurations, the control portion 502 may be configured for DL communication, as illustrated in FIG. 5. In some configurations, the control portion 502 may be a physical downlink control channel (PDCCH).

The DL-centric TDD subframe may also include a data portion 504. The data portion 504 may sometimes be referred to as the payload of the TDD subframe. The data portion 504 may include various types of information as well as any padding that may be appropriate. In some configurations, the data portion 504 may be configured for DL communication, as illustrated in FIG. 5. In some configurations, MiCr data may be included in the data portion 504. Accordingly, the data portion 504 may enable at least one opportunity to transmit MiCr data. As used herein, the opportunity to transmit MiCr data refers to the availability, option, or possibility to transmit MiCr data during a particular portion of the TDD subframe or during a particular duration of the TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist. Generally, the term 'generating' (e.g., of instructions) may refer to the activation of relevant circuits, the utilization of particular hardware components, and/or execution of corresponding algorithms that cause, trigger, or otherwise lead in the creation, construction, synthesis, development, and/or rendering of certain aspects (e.g., instructions) in accordance with the present disclosure.

The DL-centric TDD subframe may also include a guard period 506. The guard period 506 may sometimes be referred to as a guard interval without deviating from the scope of the present disclosure. Generally, the guard period 506 ensures that distinct transmissions do not interfere with one another. Such interference may include propagation delays, echoes, reflections, and other effects. For example, the guard period 506 may ensure that the DL communication of the data portion 504 (which precedes the guard period 506) does not interfere with the UL communication of the feedback portion 508 (which follows the guard period 506).

In some configurations, the feedback portion 508 may be configured for UL communication, as illustrated in FIG. 5.

The feedback portion 508 may be configured for receiving a feedback message from another apparatus. For example, the feedback message may be an ACK or a NACK. In some configurations, the feedback message corresponds to other portions of the TDD subframe. For example, an ACK in the feedback portion 508 may indicate that the MiCr data included in the data portion 504 was successfully transmitted to and received by another apparatus. Furthermore, in some configurations, the feedback portion 508 may enable at least one opportunity to receive MiCr data. As used herein, the opportunity to receive MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

As described in greater detail above, FIG. 5 illustrates an example of a DL-centric TDD subframe that enables at least one opportunity to transmit MiCr data (e.g., by including MiCr data in the data portion 504 that is transmitted) and at least one opportunity to receive MiCr data (e.g., by including MiCr data in the feedback portion 508 that is received). In many configurations, the DL-centric TDD subframe is included in a single TTI, and the duration of that TTI is no greater than 500 microseconds. By including at least one opportunity to transmit MiCr data and at least one opportunity to receive MiCr data in the same, single TDD subframe, MiCr data can be communicated sooner than it might be otherwise. As described above, some communication systems may introduce delays or increased latency in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure may reduce or eliminate these issues by enabling the communication of both UL MiCr data as well DL MiCr data in the same, single TDD subframe.

As illustrated in FIG. 5, the control portion 502 is separated from the data portion 504 by a first partition 512, the data portion 504 is separated from the guard period 506 by a second partition 514, and the guard period 506 is separated from the feedback portion 508 by a third partition 516. As used herein, the term 'partition' may refer to a marker, separation, and/or any other suitable term without deviating from the scope of the present disclosure. In some configurations, one or more of these partitions 512, 514, 516 may be adjusted, altered, optimized, and/or otherwise changed in location and/or position based on various factors. Such factors may include one or more characteristics of the MiCr data. Characteristics of the MiCr data may include the loading of the MiCr data, the amount of MiCr data to be transmitted (e.g., in the data portion 504), the amount of MiCr data to be received (e.g., in the feedback portion 508), and/or various other suitable factors.

Based on one or more characteristics of the MiCr data, one or more of these partitions 512, 514, 516 may be adjusted, altered, optimized, and/or otherwise changed in location and/or position. Accordingly, how much of the TDD subframe is configured for the at least one opportunity to transmit the MiCr data and/or how much of the TDD subframe is configured for the at least one opportunity to receive the MiCr data may be adjusted, altered, optimized, and/or otherwise changed in location and/or position based on one or more characteristics of the MiCr data. As an example, the first partition 512 may be adjusted to the left (e.g., earlier in time) if the amount of DL MiCr data to be included in data portion 504 is greater than the amount of DL MiCr data that would otherwise be accommodated in the data portion 504. As another example, the second partition 514 and the third partition 516 may be adjusted to the left (e.g., earlier in time) if the amount of UL MiCr data to be included in the feedback portion 508 is greater than the amount of MiCr data that would otherwise be accommodated in the feedback portion 508. Accordingly, various portions of the DL-centric subframe can be adjusted to accommodate for one or more characteristics of the MiCr data without adjusting the total size or length of the DL-centric subframe or TTI (e.g., 500 microseconds). One of ordinary skill in the art understands that the example illustrated in FIG. 5 is not intended to limit the scope of the present disclosure and alternative examples of a DL-centric TDD subframe are within the scope of the present disclosure.

Figure 6:
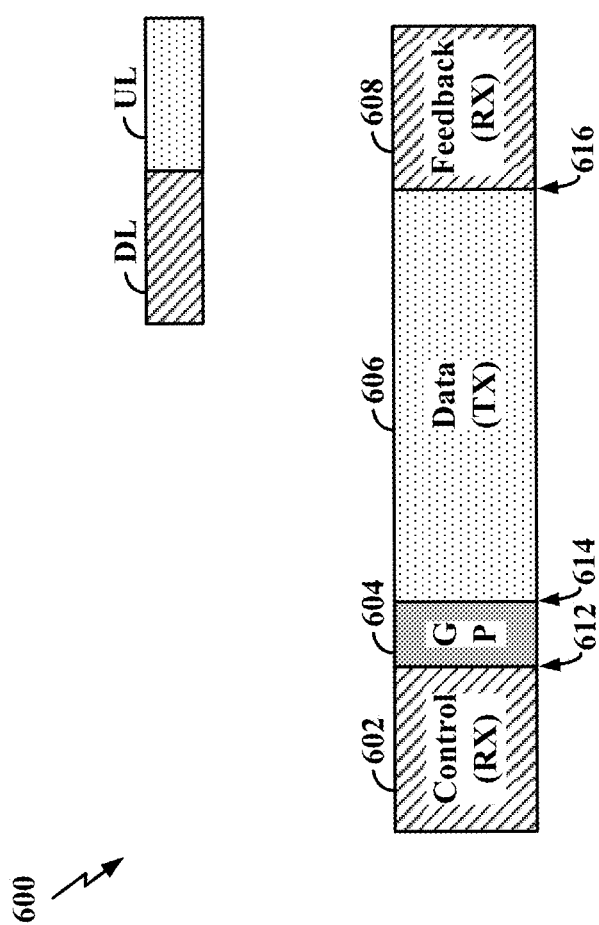
FIG. 6 is a diagram illustrating an example of an UL-centric TDD subframe according to aspects of the present disclosure.

FIG. 6 is a diagram 600 illustrating an example of an UL-centric TDD subframe according to aspects of the present disclosure. In this example, the UL-centric TDD subframe includes a control portion 602. The control portion 602 may include various scheduling information and/or control information corresponding to various portions of the UL-centric TDD subframe. In some configurations, the control portion 602 may be configured for DL communication, as illustrated in FIG. 6. In some configurations, the control portion 602 may be a PDCCH. In some configurations, MiCr data may be included in the control portion 602. Accordingly, the control portion 602 may enable at least one opportunity to receive MiCr data. As used herein, the opportunity to receive MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

The UL-centric TDD subframe may also include a guard period 604. The guard period 604 may sometimes be referred to as a guard interval without deviating from the scope of the present disclosure. Generally, the guard period 604 ensures that distinct transmissions do not interfere with one another. Such interference may include propagation delays, echoes, reflections, and other effects. For example, the guard period 604 may ensure that the DL communication of the control portion 602 (which precedes the guard period 604) does not interfere with the UL communication of the data portion 606 (which follows the guard period 604).

The data portion 606 may sometimes be referred to as the payload of the TDD subframe. The data portion 606 may include various types of information (e.g., data, scheduling resources for future transmissions, etc.) as well as any padding that may be appropriate. In some configurations, the data portion 606 may be configured for UL communication, as illustrated in FIG. 6. In some configurations, the data portion 606 may include MiCr data. Accordingly, the data portion 606 may enable at least one opportunity to transmit MiCr data. As used herein, the opportunity to transmit MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

The UL-centric TDD subframe may also include a feedback portion 608 that follows the data portion 606. In some configurations, the feedback portion 608 may be configured for DL communication, as illustrated in FIG. 6. The feedback portion 608 may be configured for receiving a feedback message from another apparatus. For example, the feedback message may be an ACK or a NACK. In some configurations, the feedback message corresponds to other portions of the TDD subframe. For example, an ACK in the feedback portion 608 may indicate that the MiCr data included in the data portion 606 was successfully transmitted to and received by another apparatus. Furthermore, in some configurations, the feedback portion 608 may include MiCr data. Accordingly, the feedback portion 608 may enable at least one additional opportunity to receive MiCr data. (As described above, the control portion 602 also enables at least one opportunity to receive MiCr data.)

As described in greater detail above, FIG. 6 illustrates an example of an UL-centric TDD subframe that enables at least one opportunity to receive MiCr data (e.g., by including MiCr data in the control portion 602 and/or the feedback portion 608 that is/are received) and at least one opportunity to transmit MiCr data (e.g., by including MiCr data in the data portion 606 that is transmitted). In many configurations, the UL-centric TDD subframe is included in a single TTI, and the duration of that TTI is no greater than 500 microseconds. By including at least one opportunity to receive MiCr data and at least one opportunity to transmit MiCr data in the same, single TDD subframe, MiCr data can be communicated sooner than it might be otherwise. As described above, some communication systems may introduce delays in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure overcome such limitations by enabling the communication of both UL MiCr data as well DL MiCr data in the same, single TDD subframe.

As illustrated in FIG. 6, the control portion 602 is separated from the guard period 604 by a first partition 612, the guard period 604 is separated from the data portion 606 by a second partition 614, and the data portion 606 is separated from the feedback portion 608 by a third partition 616. In some configurations, one or more of these partitions 612, 614, 616 may be adjusted, altered, optimized, and/or otherwise changed in location and/or position based on various factors. Such factors may include one or more characteristics of the MiCr data. Characteristics of the MiCr data may include the loading of the MiCr data, the amount of MiCr data to be transmitted (e.g., in the data portion 606), the amount of MiCr data to be received (e.g., in the control portion 602 and/or the feedback portion 608), and/or various other suitable factors.

Based on one or more characteristics of the MiCr data, one or more of these partitions 612, 614, 616 may be adjusted, altered, optimized, and/or otherwise changed in location and/or position. Accordingly, how much of the TDD subframe is configured for the at least one opportunity to transmit the MiCr data and/or how much of the TDD subframe is configured for the at least one opportunity to receive the MiCr data may be adjusted, altered, optimized, and/or otherwise changed in location and/or position based on one or more characteristics of the MiCr data. As an example, the first partition 612 and the second partition 614 may be adjusted to the right (e.g., later in time) if the amount of DL MiCr data to be included in the control portion 602 is greater than the amount of DL MiCr data that would otherwise be accommodated in the control portion 602. As another example, the third partition 516 may be adjusted to the left (e.g., earlier in time) if the amount of DL MiCr data to be included in the feedback portion 608 is greater than the amount of DL MiCr data that would otherwise be accommodated in the feedback portion 608. Accordingly, various portions of the UL-centric subframe can be adjusted to accommodate for one or more characteristics of the MiCr data without adjusting the total size or length of the UL-centric subframe or TTI (e.g., 500 microseconds). One of ordinary skill in the art understands that the example illustrated in FIG. 6 is not intended to limit the scope of the present disclosure and alternative examples of a UL-centric TDD subframe are within the scope of the present disclosure.

Figure 7:
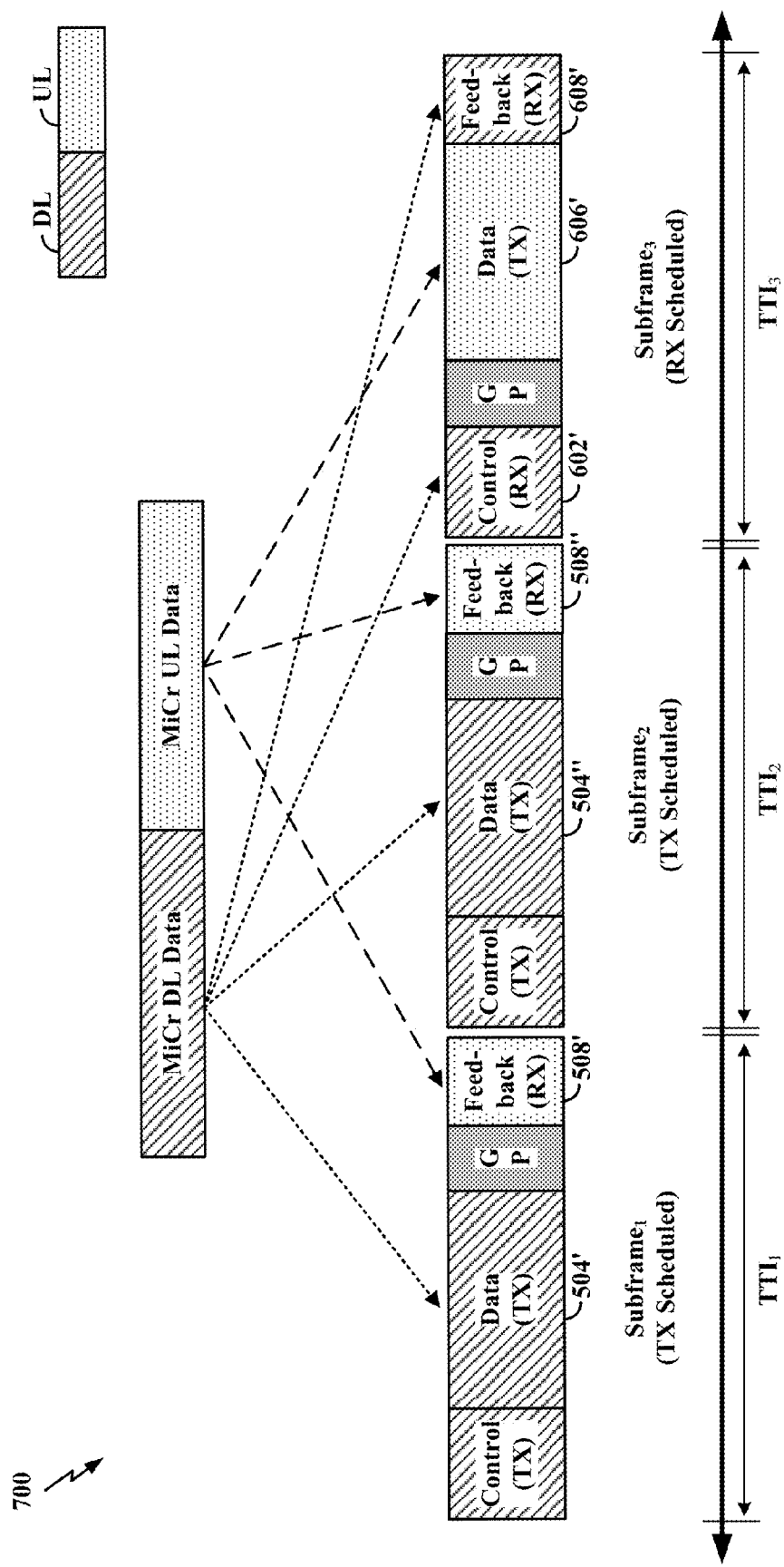
FIG. 7 is a diagram illustrating an example of various communications according to aspects of the present disclosure.

FIG. 7 is a diagram 700 illustrating an example of various communications according to aspects of the present disclosure. In this diagram 700, three subframes (Subframe$_1$, Subframe$_2$, Subframe$_3$) are shown for three TTIs (TTI$_1$, TTI$_2$, TTI$_3$, respectively). Subframe$_1$ and Subframe$_2$ are DL-centric TDD subframes, as described in greater detail above with reference to FIG. 5. Subframe$_3$ is an UL-centric TDD subframe, as described in greater detail above with reference to FIG. 6. During each TTI, there exists at least one opportunity to transmit MiCr data and at least one opportunity to receive MiCr data. For example, during TTI$_1$, MiCr data may be included in the data portion 504' of Subframe$_1$ (thus enabling at least one opportunity to transmit MiCr data), and MiCr data may be included in the feedback portion 508' of Subframe$_1$ (thus enabling at least one opportunity to receive MiCr data). As another example, during TTI$_2$, MiCr data may be included in the data portion 504" of Subframe$_2$ (thus enabling at least one opportunity to transmit MiCr data), and MiCr data may be included in the feedback portion 508" of Subframe$_2$ (thus enabling at least one opportunity to receive MiCr data). As yet another example, during TTI$_3$, MiCr data may be included in the control portion 602' of Subframe$_3$ (thus enabling a first opportunity of at least one opportunity to receive MiCr data), MiCr data may be included in the data portion 606' of Subframe$_3$ (thus enabling at least one opportunity to transmit MiCr data), and MiCr data may be included in the feedback portion 608' (thus enabling a second opportunity of at least one opportunity to receive MiCr data).

One of ordinary skill in the art understands that the TDD spectrum cannot necessarily be considered an 'always on' resource for the communication system. As such, certain TDD carriers may sometimes be unavailable to the communication system. However, the FDD spectrum may be considered an 'always on' resource for the communication system. In some configurations, the feedback message (e.g., ACK/NACK) may be communicated using an FDD carrier. This may be done because (i) the FDD is regularly available to the communication system, and/or (ii) the feedback portions (e.g., feedback portions 508', 508", 608') of the TDD subframe may be occupied with MiCr data. Accordingly, in some configurations, an FDD carrier may be utilized for communication of a feedback message corresponding to MiCr data. Also, in some configurations, an FDD carrier may be utilized for retransmission (e.g., hybrid automatic repeat request (HARQ) retransmission) of the MiCr data. In some configurations, the feedback message (e.g., ACK/NACK) may be communicated using a paired TDD carrier. In such configurations, the paired TDD carrier may be utilized for communication of a feedback message corresponding to MiCr data and/or for retransmission (e.g., HARQ retransmission) of the MiCr data.

The communication system may determine how frequently to utilize an UL-centered TDD subframe and/or a DL-centered TDD subframe according to various factors without deviating from the scope of the present disclosure. In some configurations, the communication system may determine how frequently to utilize an UL-centered TDD subframe and/or a DL-centered TDD subframe according to predetermined settings set by the network. Accordingly, the proportion, number, ratio, and/or percentage of UL-centered TDD subframes relative to DL-centered TDD subframes may be determined according to such predetermined settings set by the network. In some configurations, the communication system may determine how frequently to utilize an UL-centered TDD subframe and/or a DL-centered TDD subframe according to settings that are dynamically or semi-statically adjusted based on various traffic or network conditions. For instance, if current traffic or network conditions indicate a relatively high proportion, number, ratio, and/or percentage of UL data (e.g., UL MiCr data), then the communication system may utilize a greater proportion, number, ratio, and/or percentage of UL-centric subframes relative to the proportion, number, ratio, and/or percentage of DL-centric subframes. Conversely, if current traffic or network conditions indicate a relatively high proportion, number, ratio, and/or percentage of DL data (e.g., DL MiCr data), then the communication system may utilize a greater proportion, number, ratio, and/or percentage of DL-centric subframes relative to the proportion, number, ratio, and/or percentage of UL-centric subframes.

Figure 8:
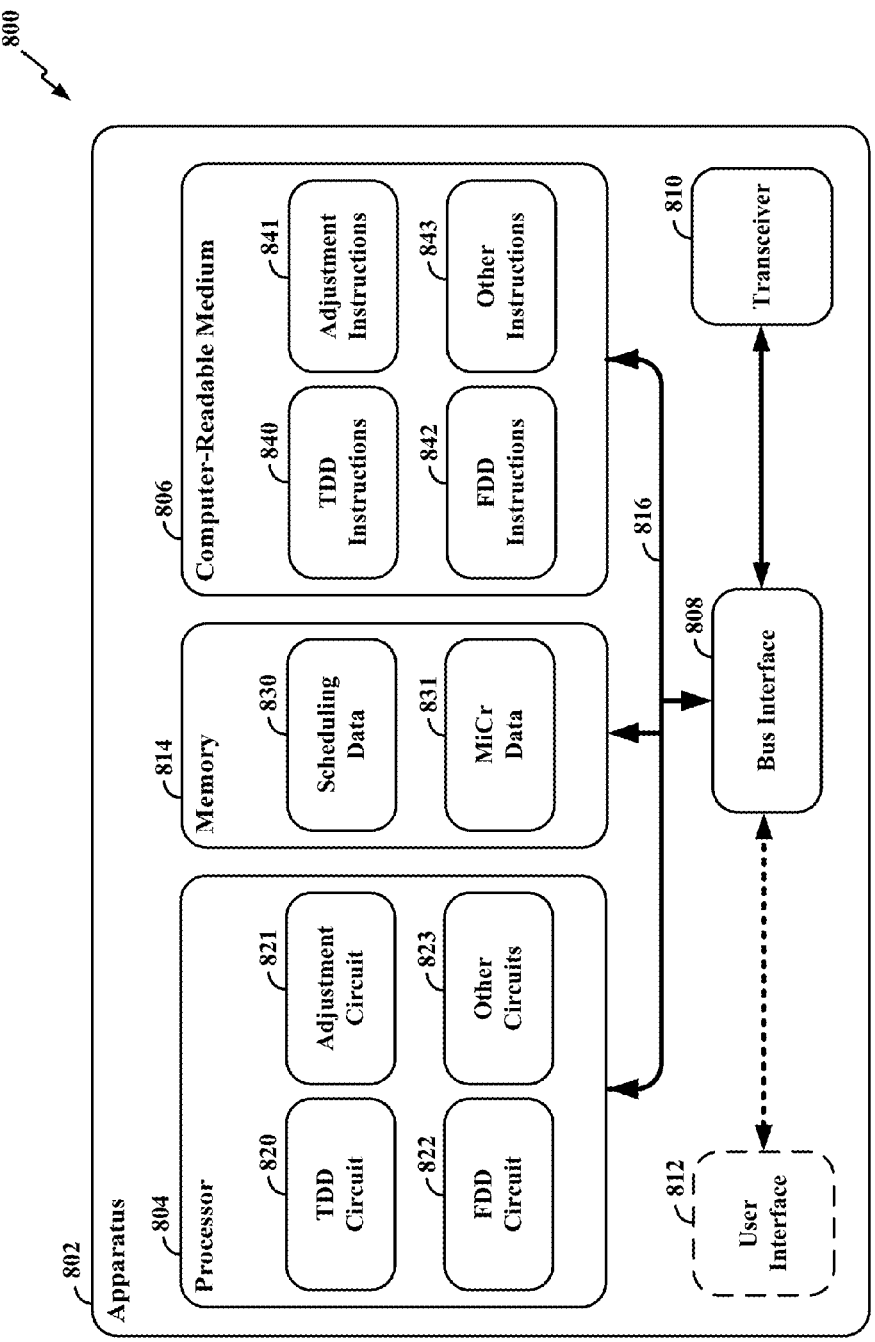
FIG. 8 is a diagram illustrating an example of a hardware implementation of an apparatus according to various aspects of the present disclosure.

FIG. 8 is a diagram 800 illustrating an example of a hardware implementation of an apparatus 802 according to various aspects of the present disclosure. Generally, the apparatus 802 may be any device configured for wireless communication. In some configurations, the apparatus 802 may be Device$_A$ 102, as described in greater detail above. In some configurations, the apparatus 802 may be Device$_B$ 104, as described in greater detail above. The apparatus 802 may include a user interface 812. The user interface 812 may be configured to receive one or more inputs from a user of the apparatus 802. The user interface 812 may also be configured to display information to the user of the apparatus 802. The user interface 812 may exchange data via the bus interface 808.

The apparatus 802 may also include a transceiver 810. The transceiver 810 may be configured to receive data and/or transmit data in communication with another apparatus. The transceiver 810 provides a means for communicating with another apparatus via a wired or wireless transmission medium. In some configurations, the transceiver 810 may provide the means for communicating MiCr data in a TDD subframe during a single TTI. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 810 may provide Device$_A$ 102 with the means for transmitting data (e.g., MiCr data) to Device$_B$ 104 as well as the means for receiving data (e.g., MiCr data) from Device$_B$ 104 (e.g., in a TDD subframe during a single TTI). In some other examples, the transceiver 810 may provide Device$_B$ 104 with the means for transmitting data (e.g., MiCr data) to Device$_A$ 102 as well as the means for receiving data (e.g., MiCr data) from Device$_A$ 102 (e.g., in a TDD subframe during a single TTI). The transceiver 810 may be configured to perform such communications using various types of technologies, as described in greater detail above. One of ordinary skill in the art will understand that many types of technologies may perform such communication without deviating from the scope of the present disclosure.

The apparatus 802 may also include a memory 814, one or more processors 804, a computer-readable medium 806, and a bus interface 808. The bus interface 808 may provide an interface between a bus 816 and the transceiver 810. The memory 814, the one or more processors 804, the computer-readable medium 806, and the bus interface 808 may be connected together via the bus 816. The processor 804 may be communicatively coupled to the transceiver 810 and/or the memory 814.

The processor 804 may include a TDD circuit 820. The TDD circuit 820 may include various hardware components and/or may perform various algorithms that provide the means for enabling at least one opportunity to transmit MiCr data and at least one opportunity to receive the MiCr data in a TDD subframe during a single TTI. The TDD circuit 820 may also include various hardware components and/or may perform various algorithms that provide the means for communicating the MiCr data in the TDD subframe during the single TTI.

The processor 804 may also include an adjustment circuit 821. The adjustment circuit 821 may include various hardware components and/or may perform various algorithms that provide the means for adjusting how much of the TDD subframe is configured for the at least one opportunity to transmit the MiCr data and how much of the TDD subframe is configured for the at least one opportunity to receive the MiCr data based on one or more characteristics of the MiCr data. The processor 804 may also include an FDD circuit 822. The FDD circuit 822 may include various hardware components and/or may perform various algorithms that provide the means for utilizing an FDD carrier for communication of a feedback message corresponding to the MiCr data. The FDD circuit 822 may also include various hardware components and/or may perform various algorithms that provide the means for utilizing an FDD carrier for retransmission of the MiCr data. The foregoing description provides a non-limiting example of the processor 804 of the apparatus 802. Although various circuits 820, 821, 822 are described above, one of ordinary skill in the art will understand that the processor 804 may also include various other circuits 823 that are in addition and/or alternative(s) to the aforementioned circuits 820, 821, 822. Such other circuits 823 may provide the means for performing any one or more of the functions, methods, processes, features and/or aspects described herein.

The computer-readable medium 806 may include various computer-executable instructions. The computer-executable instructions may include computer-executable code configured to perform various functions and/or enable various aspects described herein. The computer-executable instructions may be executed by various hardware components (e.g., the processor 804 and/or any of its circuits 820, 821, 822, 823) of the apparatus 802. The computer-executable instructions may be a part of various software programs and/or software modules. The computer-readable medium 806 may include TDD instructions 840. The TDD instructions 840 may include computer-executable instructions configured for enabling at least one opportunity to transmit MiCr data and at least one opportunity to receive the MiCr data in a TDD subframe during a single TTI. The TDD instructions 840 may also include computer-executable instructions configured for communicating the MiCr data in the TDD subframe during the single TTI.

The computer-readable medium 806 may also include adjustment instructions 841. The adjustment instructions 841 may include computer-executable instructions configured for adjusting how much of the TDD subframe is configured for the at least one opportunity to transmit the MiCr data and how much of the TDD subframe is configured for the at least one opportunity to receive the MiCr data based on one or more characteristics of the MiCr data. The computer-readable medium 806 may include FDD instructions 842. The FDD instructions 842 may include computer-executable instructions configured for utilizing an FDD carrier for communication of a feedback message corresponding to the MiCr data. The FDD instructions 842 may also include computer-executable instructions configured for utilizing an FDD carrier for retransmission of the MiCr data. The foregoing description provides a non-limiting example of the computer-readable medium 806 of the apparatus 802. Although various computer-executable instructions 840, 841, 842 are described above, one of ordinary skill in the art will understand that the computer-readable medium 806 may also include various other computer-executable instructions 843 that are in addition and/or alternative(s) to the aforementioned computer-executable instructions 840, 841, 842. Such other computer-executable instructions 843 may be configured for any one or more of the functions, methods, processes, features and/or aspects described herein.

The memory 814 may include various memory modules. The memory modules may be configured to store, and have read therefrom, various values and/or information by the processor 804, or any of its circuits 820, 821, 822, 823. The memory modules may also be configured to store, and have read therefrom, various values and/or information upon execution of the computer-executable code included in the computer-readable medium 806, or any of its instructions 840, 841, 842, 843. The memory 814 may include scheduling data 830. The scheduling data 830 may include at least some of the information included in one or more of the control portions 502, 502', 502", 602, 602' described herein. The memory may also include MiCr data 831. The MiCr data 831 may include at least some of the MiCr data that may be included in one or more of the control portions 602, 602', data portions 504, 504', 504", 604, 604', and/or feedback portions 508, 508', 508", 608, 608' described herein. The foregoing description provides a non-limiting example of the memory 814 of the apparatus 802. Although various types of data of the memory 814 are described above, one of ordinary skill in the art will understand that the memory 814 may also include various other data that are in addition and/or alternative(s) to the aforementioned data 830, 831. Such other data may be associated with any one or more of the functions, methods, processes, features and/or aspects described herein.

One of ordinary skill in the art will also understand that the apparatus 802 may include alternative and/or additional features without deviating from the scope of the present disclosure. In accordance with various aspects of the present disclosure, an element, or any portion of an element, or any combination of elements may be implemented with a processing system that includes one or more processors 804. Examples of the one or more processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 816 and bus interface 808. The bus 816 may include any number of interconnecting buses and bridges depending on the specific application of the processing system and the overall design constraints. The bus 816 may link together various circuits including the one or more processors 804, the memory 814, and the computer-readable medium 806. The bus 816 may also link various other circuits such as timing sources, peripherals, voltage regulators, and power management circuits, which are well known in the art.

The one or more processors 804 may be responsible for managing the bus 816 and general processing, including the execution of software stored on the computer-readable medium 806. The software, when executed by the one or more processors 804, causes the processing system to perform the various functions described below for any one or more apparatuses. The computer-readable medium 806 may also be used for storing data that is manipulated by the one or more processors 804 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may also include, by way of example, a carrier wave, a transmission line, and any other suitable medium for transmitting software and/or instructions that may be accessed and read by a computer. The computer-readable medium 806 may reside in the processing system, external to the processing system, or distributed across multiple entities including the processing system. The computer-readable medium 806 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 9:
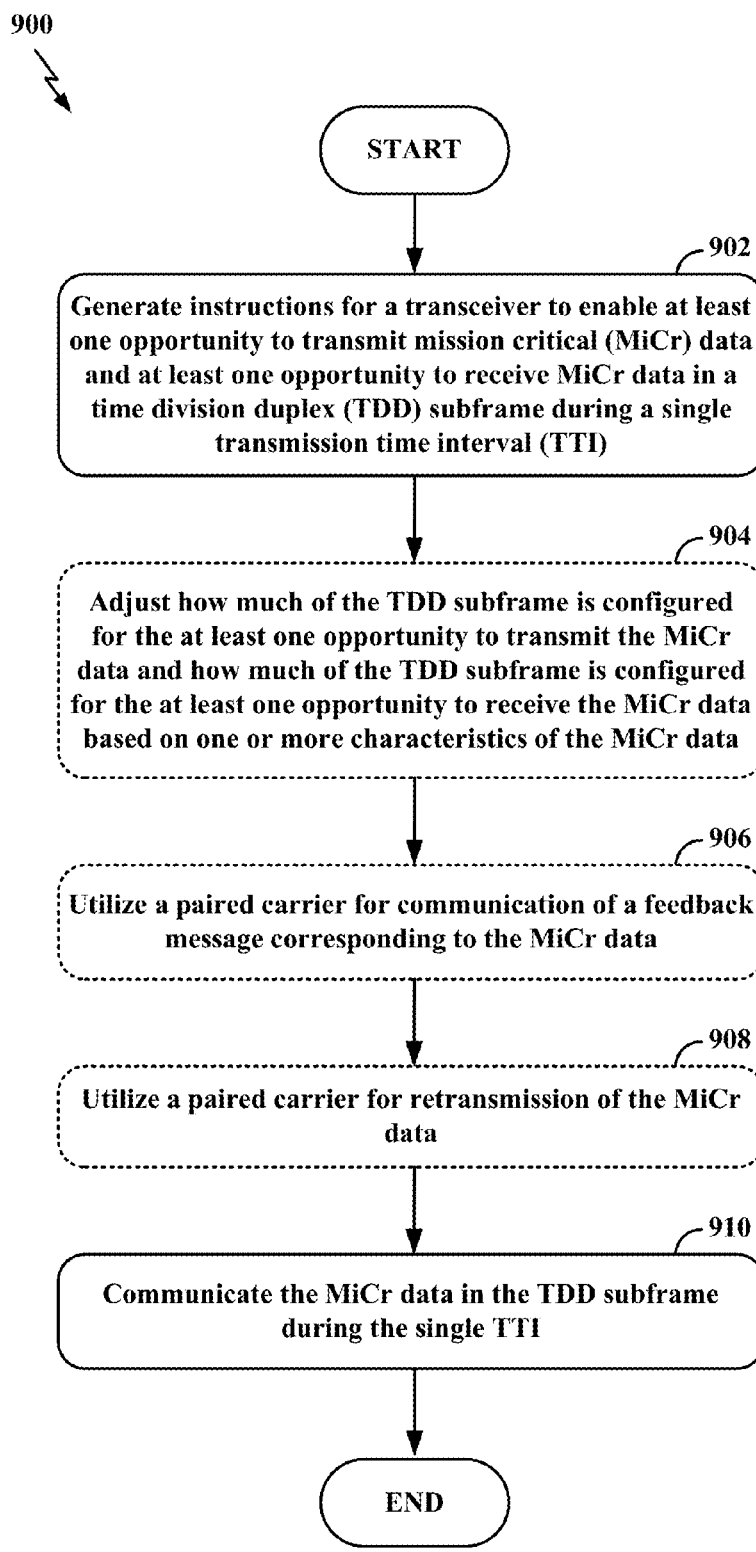
FIG. 9 is a diagram illustrating an example of various methods and/or processes according to aspects of the present disclosure.

FIG. 9 is a diagram 900 illustrating an example of various methods and/or processes according to aspects of the present disclosure. The methods and/or processes may be performed by an apparatus. In some configurations, such an apparatus is the apparatus 802 described above with reference to FIG. 8. In some configurations, such an apparatus is Device$_A$ 102 (described above). In some configurations, such an apparatus is Device$_B$ 104 (described above). At block 902, the apparatus (e.g., apparatus 802, Device$_A$ 102, Device$_B$ 104) may generate instructions for a transceiver to enable at least one opportunity to transmit MiCr data and at least one opportunity to receive the MiCr data in a TDD subframe during a single TTI. For example, referring to FIG. 7, during TTI$_1$, MiCr data may be included in the data portion 504' of Subframe$_1$ (thus enabling at least one opportunity to transmit MiCr data), and MiCr data may be included in the feedback portion 508' of Subframe$_1$ (thus enabling at least one opportunity to receive MiCr data). During TTI$_2$, MiCr data may be included in the data portion 504" of Subframe$_2$ (thus enabling at least one opportunity to transmit MiCr data), and MiCr data may be included in the feedback portion 508" of Subframe$_2$ (thus enabling at least one opportunity to receive MiCr data). During TTI$_3$, MiCr data may be included in the control portion 602' of Subframe$_3$ (thus enabling a first opportunity of at least one opportunity to receive MiCr data), MiCr data may be included in the data portion 606' of Subframe$_3$ (thus enabling at least one opportunity to transmit MiCr data), and MiCr data may be included in the feedback portion 608' (thus enabling a second opportunity of at least one opportunity to receive MiCr data).

In some configurations, at block 904, the apparatus (e.g., apparatus 802, Device$_A$ 102, Device$_B$ 104) adjusts how much of the TDD subframe is configured for the at least one opportunity to transmit the MiCr data and how much of the TDD subframe is configured for the at least one opportunity to receive the MiCr data based on one or more characteristics of the MiCr data. For example, one or more of the partitions 512, 514, 516 in FIG. 5 and/or one or more of the partitions 612, 614, 616 may be adjusted, altered, optimized, and/or otherwise changed in location and/or position based one or more characteristics of the MiCr data. Characteristics of the MiCr data may include the loading of the MiCr data, the amount of MiCr data to be transmitted, the amount of MiCr data to be received, and/or various other suitable factors.

In some configurations, at block 906, the apparatus (e.g., apparatus 802, Device$_A$ 102, Device$_B$ 104) utilizes a paired carried (e.g., an FDD carrier or a paired TDD carrier) for communication of a feedback message corresponding to the MiCr data. Because MiCr data may be included in at least some of the feedback portions (e.g., feedback portions 508', 508", 608' in FIG. 7), the feedback message (e.g., ACK/NACK) may be communicated using an FDD carrier or a TDD carrier. In some configurations, at block 908, the apparatus may utilize a paired carried (e.g., an FDD carrier or a paired TDD carrier) for retransmission of the MiCr data. For example, if the feedback message (corresponding to the MiCr data transmission) is a NACK, then an FDD carrier or a paired TDD carrier may be utilized for HARQ retransmission of that MiCr data. In some configurations, the apparatus (e.g., apparatus 802, Device$_A$ 102, Device$_B$ 104) transmits the MiCr data in the TDD subframe and receives the MiCr data in the TDD subframe during the same, single TTI. As described in greater detail above, such a TDD subframe may be considered a self-contained TDD subframe. Examples of such subframes are described above with reference to FIGS. 5-7, for example, and therefore will not be repeated. At block 910, the apparatus may communicate the MiCr data in the TDD subframe during the single TTI.

The methods and/or processes described with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Additionally, some or all of the methods and/or processes described with reference to FIG. 9 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. An apparatus for wireless communication, the apparatus comprising:
   a transceiver;
   a memory; and
   at least one processor communicatively coupled to the transceiver and the memory, wherein the at least one processor and the memory are configured to:
   generate instructions for the transceiver to enable at least one opportunity to transmit a first mission critical (MiCr) data and at least one opportunity to receive a second MiCr data in a time division duplex (TDD) subframe during a single transmission time interval (TTI), the at least one opportunity to transmit separated from the at least one opportunity to receive by at least a first partition;

adjust a position of the first partition based on one or more of a characteristic of the first MiCr data or a characteristic of the second MiCr data; and communicate one or more of the first MiCr data or the second MiCr data in the TDD subframe during the single TTI.

2. The apparatus of claim 1, wherein the at least one processor and the memory are further configured to:

based on one or more characteristics of the first MiCr data and the second MiCr data, generate instructions for the transceiver to adjust how much of the TDD subframe is configured for the at least one opportunity to transmit the first MiCr data and how much of the TDD subframe is configured for the at least one opportunity to receive the second MiCr data.

3. The apparatus of claim 1, wherein the TDD subframe comprises a downlink (DL)-centric TDD subframe, the DL-centric TDD subframe comprising:

a first portion comprising the at least one opportunity to transmit the first MiCr data;

a guard period following the first portion; and a second portion following the guard period, wherein the second portion corresponds to the first portion and comprises the at least one opportunity to receive the second MiCr data.

4. The apparatus of claim 1, wherein the TDD subframe comprises an uplink (UL)-centric TDD subframe, the UL-centric TDD subframe comprising:

a first portion comprising a first opportunity of the at least one opportunity to receive the second MiCr data;

a guard period following the first portion;

a second portion following the guard period, wherein the second portion comprises the at least one opportunity to transmit the first MiCr data; and a third portion following the second portion, wherein the third portion corresponds to the second portion and comprises a second opportunity of the at least one opportunity to receive a third MiCr data.

5. The apparatus of claim 1, wherein the at least one processor and the memory are further configured to:

generate instructions for the transceiver to utilize a frequency duplex division (FDD) carrier or a paired TDD carrier for communication of a feedback message corresponding to the first MiCr data.

6. The apparatus of claim 1, wherein the at least one processor and the memory are further configured to:

generate instructions for the transceiver to utilize a frequency duplex division (FDD) carrier or a paired TDD carrier for retransmission of the first MiCr data.

7. The apparatus of claim 1, wherein the single TTI comprises no greater than 500 microseconds.

8. The apparatus of claim 1, wherein one or more of the first MiCr data or the second MiCr data comprises data having a latency requirement lower than a latency requirement of another data included in the TDD subframe.

9. The apparatus of claim 1, wherein one or more of the first MiCr data or the second MiCr data comprises data having a priority requirement higher than a priority requirement of another data included in the TDD subframe.

10. The apparatus of claim 1, wherein one or more of the first MiCr data or the second MiCr data comprises data having a reliability requirement higher than a reliability requirement of another data included in the TDD subframe.

11. The apparatus of claim 1, wherein the TDD subframe comprises:

control information in a control portion of the TDD subframe;

data information in a data portion of the TDD subframe, the data information corresponding to the control information; and acknowledgement information in an acknowledgement portion of the TDD subframe, the acknowledgement information corresponding to the data information, wherein the control portion, the data portion, and the acknowledgement portion are contained in the same TDD subframe.

12. A method for wireless communication, the method comprising:

generating instructions for a transceiver to enable at least one opportunity to transmit a first mission critical (MiCr) data and at least one opportunity to receive a second MiCr data in a time division duplex (TDD) subframe during a single transmission time interval (TTI), the at least one opportunity to transmit separated from the at least one opportunity to receive by at least a first partition;

adjusting a position of the first partition based on one or more of a characteristic of the first MiCr data or a characteristic of the second MiCr data; and communicating one or more of the first MiCr data or the second MiCr data in the TDD subframe during the single TTI.

13. The method of claim 12, further comprising:

based on one or more characteristics of the first MiCr data and the second MiCr data, generating instructions for the transceiver to adjust how much of the TDD subframe is configured for the at least one opportunity to transmit the first MiCr data and how much of the TDD subframe is configured for the at least one opportunity to receive the second MiCr data.

14. The method of claim 12, wherein the TDD subframe comprises a downlink (DL)-centric TDD subframe, the DL-centric TDD subframe comprising:

a first portion comprising the at least one opportunity to transmit the first MiCr data;

a guard period following the first portion; and a second portion following the guard period, wherein the second portion corresponds to the first portion and comprises the at least one opportunity to receive the second MiCr data.

15. The method of claim 12, wherein the TDD subframe comprises an uplink (UL)-centric TDD subframe, the UL-centric TDD subframe comprising:

a first portion comprising a first opportunity of the at least one opportunity to receive the second MiCr data;

a guard period following the first portion;

a second portion following the guard period, wherein the second portion comprises the at least one opportunity to transmit the first MiCr data; and a third portion following the second portion, wherein the third portion corresponds to the second portion and comprises a second opportunity of the at least one opportunity to receive a third MiCr data.

16. The method of claim 12, further comprising at least one of:

generating instructions for the transceiver to utilize a frequency duplex division (FDD) carrier or a paired TDD carrier for communication of a feedback message corresponding to the MiCr data; or generating instructions for the transceiver to utilize an FDD carrier or a paired TDD carrier for retransmission of the first MiCr data.

17. The method of claim 12, wherein the single TTI comprises no greater than 500 microseconds, and wherein at least one of the first MiCr data and the second MiCr data comprises data having at least one of a latency requirement lower than a latency requirement of another data included in the TDD subframe, a priority requirement higher than a priority requirement of the other data included in the TDD subframe, or a reliability requirement higher than a reliability requirement of the other data included in the TDD subframe.

18. The method of claim 12, wherein the TDD subframe comprises:
control information in a control portion of the TDD subframe;
data information in a data portion of the TDD subframe, the data information corresponding to the control information; and
acknowledgement information in an acknowledgement portion of the TDD subframe, the acknowledgement information corresponding to the data information,
wherein the control portion, the data portion, and the acknowledgement portion are contained in the same TDD subframe.

19. A non-transitory computer-readable medium comprising instructions that, when executed by a wireless communication device, cause the device to:
enable at least one opportunity to transmit a first mission critical (MiCr) data and at least one opportunity to receive a second MiCr data in a time division duplex (TDD) subframe during a single transmission time interval (TTI), the at least one opportunity to transmit separated from the at least one opportunity to receive by at least a first partition;
adjust a position of the first partition based on one or more of a characteristic of the first MiCr data or a characteristic of the second MiCr data; and
communicate one or more of the first MiCr data or the second MiCr data in the TDD subframe during the single TTI.

20. The non-transitory computer-readable medium of claim 19, wherein the instructions further cause the device to:
based on one or more characteristics of the first MiCr data and the second MiCr data, adjust how much of the TDD subframe is configured for the at least one opportunity to transmit the first MiCr data and how much of the TDD subframe is configured for the at least one opportunity to receive the second MiCr data.

21. The non-transitory computer-readable medium of claim 19, wherein the TDD subframe comprises a downlink (DL)-centric TDD subframe, the DL-centric TDD subframe comprising:
a first portion comprising the at least one opportunity to transmit the first MiCr data;
a guard period following the first portion; and
a second portion following the guard period, wherein the second portion corresponds to the first portion and comprises the at least one opportunity to receive the second MiCr data.

22. The non-transitory computer-readable medium of claim 19, wherein the TDD subframe comprises an uplink (UL)-centric TDD subframe, the UL-centric TDD subframe comprising:
a first portion comprising a first opportunity of the at least one opportunity to receive the second MiCr data;
a guard period following the first portion;
a second portion following the guard period, wherein the second portion comprises the at least one opportunity to transmit the first MiCr data; and
a third portion following the second portion, wherein the third portion corresponds to the second portion and comprises a second opportunity of the at least one opportunity to receive a third MiCr data.

23. The non-transitory computer-readable medium of claim 19, wherein the instructions further cause the device to perform at least one of:
utilize a frequency duplex division (FDD) carrier or a paired TDD carrier for communication of a feedback message corresponding to the first MiCr data; or
utilize an FDD carrier or a paired TDD carrier for retransmission of the first MiCr data.

24. The non-transitory computer-readable medium of claim 19, wherein the single TTI comprises no greater than 500 microseconds, and wherein at least one of the first MiCr data and the second MiCr data comprises data having at least one of a latency requirement lower than a latency requirement of another data included in the TDD subframe, a priority requirement higher than a priority requirement of the other data included in the TDD subframe, or a reliability requirement higher than a reliability requirement of the other data included in the TDD subframe.

25. An apparatus for wireless communication, the apparatus comprising:
means for enabling at least one opportunity to transmit a first mission critical (MiCr) data and at least one opportunity to receive a second MiCr data in a time division duplex (TDD) subframe during a single transmission time interval (TTI), the at least one opportunity to transmit separated from the at least one opportunity to receive by at least a first partition;
means for adjusting a position of the first partition based on one or more of a characteristic of the first MiCr data or a characteristic of the second MiCr data; and
means for communicating one of more of first MiCr data or the second MiCr data in the TDD subframe during the single TTI.

26. The apparatus of claim 25, further comprising:
means for adjusting, based on one or more characteristics of the first MiCr data and the second MiCr data, how much of the TDD subframe is configured for the at least one opportunity to transmit the first MiCr data and how much of the TDD subframe is configured for the at least one opportunity to receive the second MiCr data.

27. The apparatus of claim 25, wherein the TDD subframe comprises a downlink (DL)-centric TDD subframe, the DL-centric TDD subframe comprising:
a first portion comprising the at least one opportunity to transmit the first MiCr data;
a guard period following the first portion; and
a second portion following the guard period, wherein the second portion corresponds to the first portion and comprises the at least one opportunity to receive the second MiCr data.

28. The apparatus of claim 25, wherein the TDD subframe comprises an uplink (UL)-centric TDD subframe, the UL-centric TDD subframe comprising:
a first portion comprising a first opportunity of the at least one opportunity to receive the second MiCr data;
a guard period following the first portion;
a second portion following the guard period, wherein the second portion comprises the at least one opportunity to transmit the first MiCr data; and
a third portion following the second portion, wherein the third portion corresponds to the second portion and comprises a second opportunity of the at least one opportunity to receive a third MiCr data.

29. The apparatus of claim 25, further comprising at least one of:
- means for utilizing a frequency duplex division (FDD) carrier or a paired TDD carrier for communication of a feedback message corresponding to the first MiCr data; or
- means for utilizing an FDD carrier or a paired TDD carrier for retransmission of the first MiCr data.

30. The apparatus of claim 25, wherein the single TTI comprises no greater than 500 microseconds, and wherein at least one of the first MiCr data and the second MiCr data comprises data having at least one of a latency requirement lower than a latency requirement of another data included in the TDD subframe, a priority requirement higher than a priority requirement of the other data included in the TDD subframe, or a reliability requirement higher than a reliability requirement of the other data included in the TDD subframe.

* * * * *